Nov. 3, 1931.  E. LIIMATTA  1,830,552
STEERER FOR TRACTORS
Filed May 17, 1930   2 Sheets-Sheet 1
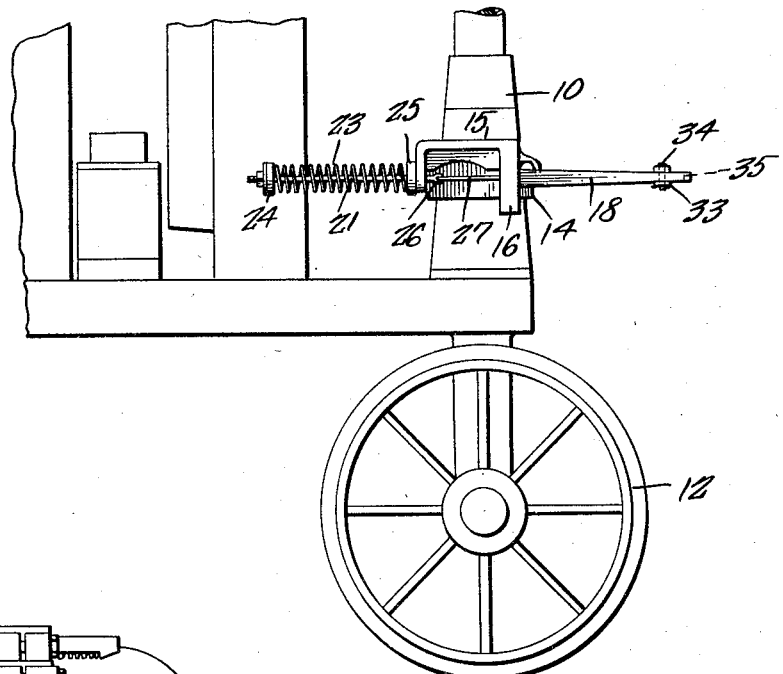
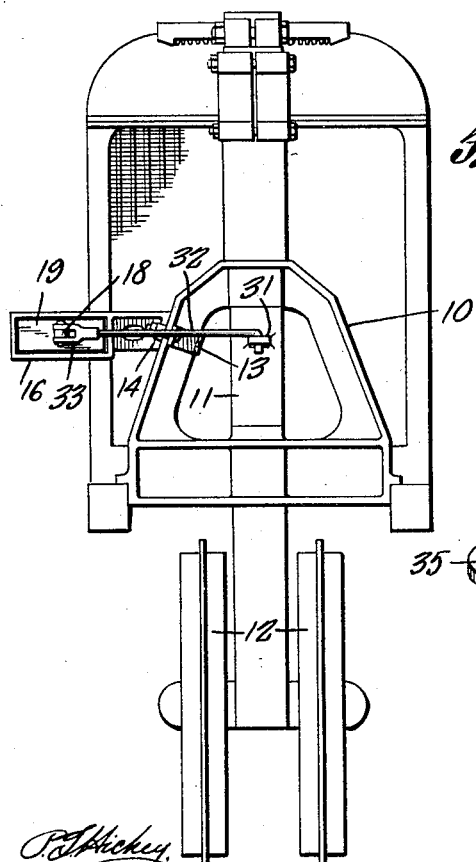
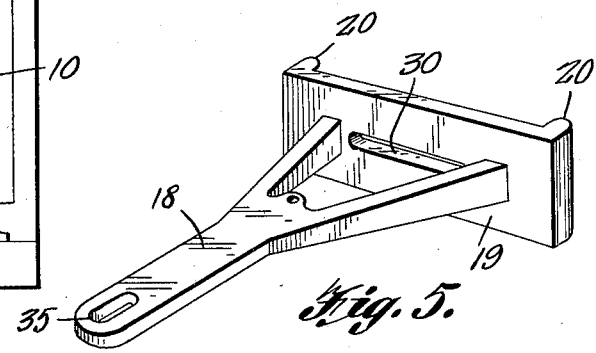
Emel Liimatta,
INVENTOR Nov. 3, 1931.  E. LIIMATTA  1,830,552
STEERER FOR TRACTORS
Filed May 17, 1930  2 Sheets-Sheet 2
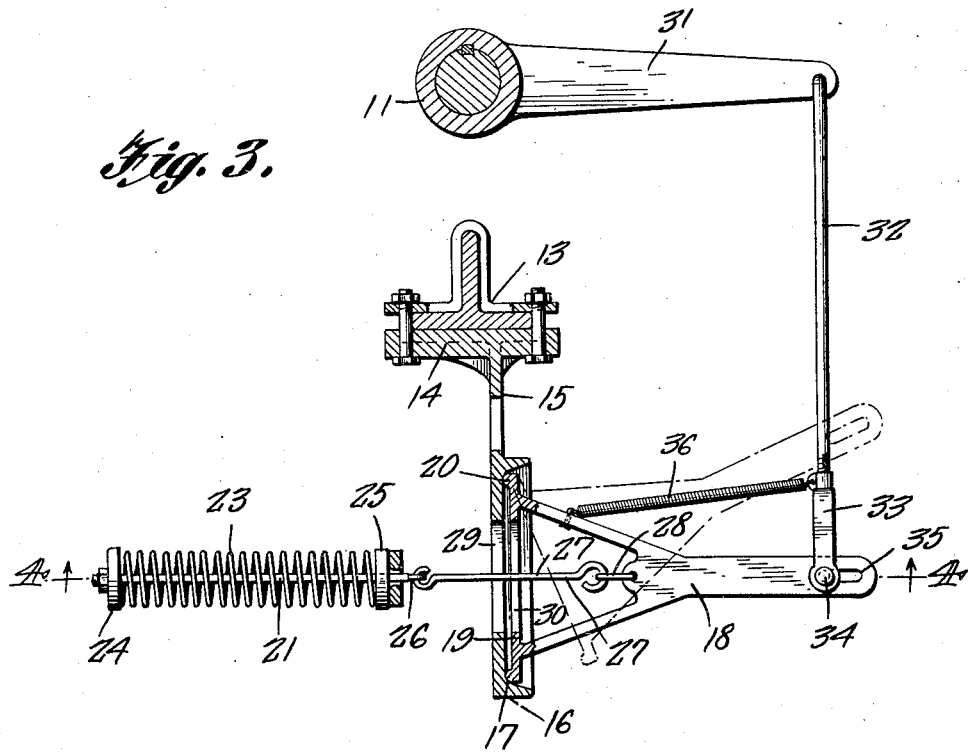
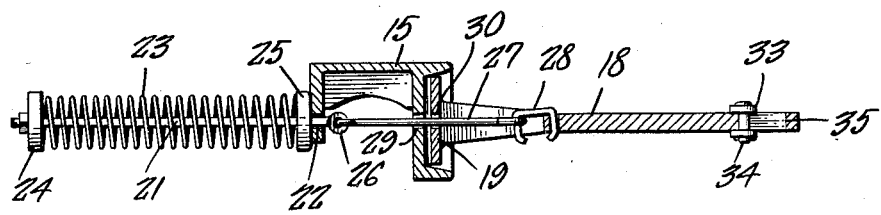
Emil Liimatta,
INVENTOR Patented Nov. 3, 1931

1,830,552

UNITED STATES PATENT OFFICE

EMEL LIIMATTA, OF FREDERICK, SOUTH DAKOTA

STEERER FOR TRACTORS

Application filed May 17, 1930. Serial No. 453,297.

This invention relates to improvements in tractors and has a special relation to the steering mechanism thereof.

An object of the present invention is to provide means connected with the steering mechanism to yieldingly maintain the latter in a straightaway position, so that the tractor may be held in a straight course with very little or no effort on the part of the driver, even when the tractor is traveling over rough and uneven roads.

Another object of the invention is the provision of means of the above character in which the steering wheels of the tractors are yieldingly held in a straightaway position, and in which the steering resistance is decreased as the steering post is rotated, while an even tension is maintained upon the yieldable holding means.

With the above and other objects in view, the invention further includes the following novel features and details of construction, to be hereinafter more fully described, illustrated in the accompanying drawings and pointed out in the appended claims.

In the drawings:—

Figure 1 is a fragmentary elevation of the front part of a tractor with the invention applied.

Figure 2 is a front view.

Figure 3 is an enlarged fragmentary horizontal sectional view with the parts in normal position.

Figure 4 is a sectional view taken substantially on the line 4—4 of Figure 3.

Figure 5 is a detail perspective view of the lever.

Referring to the drawings in detail, wherein like characters of reference denote corresponding parts, the reference character 10 indicates that part of the tractor frame which provides a support for the steering post 11, whereby the steering wheels 12 are positioned to control the direction of travel of the tractor.

The frame 10 has clamped thereto as shown at 13, the inner end 14 of a supporting member or plate 15. This plate is provided with a flange 16 of rectangular configuration so as to provide a seat 17 for the inner end of a lever 18. This lever is provided with a relatively wide base 19 which extends laterally upon opposite sides of the longitudinal center of the lever. This provides a wide bearing surface for the lever so that the latter may be firmly seated against the frame. The opposite side edges of the base 19 are provided with ribs 20, and these ribs bear upon opposite side edges of the seat 17 and provide fulcrums upon which the lever may be rocked.

The lever is yieldingly and firmly held upon its seat and for this purpose there is provided a rod 21 which extends through an opening 22 provided in the plate 15. A spring 23 is mounted upon this rod and has its opposite ends bearing against washers or discs 24 and 25. The last mentioned washer bears against the frame 15, so that longitudinal movement of the rod 21 in one direction will be yieldingly resisted.

Pivotally connected to the rod 21 as shown at 26 is one end of a link 27, and the opposite end of this link is pivotally connected with a clip 28, which is in turn pivotally connected with the lever 18 along the longitudinal center of the latter and between the fulcrums 20. The frame 15 and the base 19 of the lever 18 are provided with elongated slots 29 and 30 respectively, and the link 27 passes through these slots.

Extending from and rigid with the steering post 11 of an arm 31, and pivotally connected with the outer end of this arm is one end of a rod 32. The other end of this rod has connected thereto a clevis 33 and the latter receives the outer end of the lever 18 and is connected thereto by means of a pivot bolt 34 which passes through an elongated slot 35 provided in the lever 18. A spring 36 connects the clevis 33 with the lever 18 and acts to yieldingly hold the pivot 34 at the inner end of the slot 35.

When the tractor is traveling straight ahead, the parts will be arranged as shown in Figure 3 of the drawings, the base 19 of the lever 18 being held parallel with the seat 17. As the tractor is steered in either direction, rotation of the post 11 will move the arm 31 and rock the lever 18 upon one of its fulcrums 20, as shown by the dotted lines in Figure 3 of the drawings. As the lever 18 rocks upon its fulcrum, the position of the pivot 34 will change with respect to said fulcrum so that the amount of leverage necessary to rotate the steering post will be decreased as the steering post is rotated. The slots 29 and 30 in the frame 15 and base 19 permit of lateral swinging movement of the link 27 when the lever 18 is rocked, and a constant and even tension is maintained upon the spring 23.

The invention is susceptible of various changes in its form, proportions and minor details of construction and the right is herein reserved to make such changes as properly fall within the scope of the appended claims.

Having described the invention what is claimed is:—

1. In a tractor attachment, a plate including a horizontally disposed body portion, and an attaching portion projecting from one end of the body portion and rigidly secured to the tractor, opposed flanges depending from said body portion, one of said flanges having a recess in one side thereof, a lever having a relatively wide end portion seated in said recess and formed with fulcrums to support the lever for rocking movements, an arm extending radially from the steering post, a rod having one end pivotally secured to the arm and its other end slidingly and pivotally connected with the lever at the longitudinal center of the latter, means to yieldingly resist sliding movement of the rod upon the lever, and means associated with the other flange of the plate to yieldingly resist rocking movement of said lever.

2. In a tractor attachment, a plate including a horizontally disposed body portion, and an attaching portion projecting from one end of the body portion and rigidly secured to the tractor, opposed flanges depending from said body portion, one of said flanges having an opening, a yieldably supported rod slidable through said opening, the other of said flanges having a recess at one side thereof, a lever having a relatively wide end portion seated in said recess and formed with fulcrums to support the lever for rocking movements, the last mentioned flange of the plate having a longitudinal slot, a link movable in said slot and connecting said rod with the longitudinal center of the lever, an arm extending radially from the steering post, and a rod connected with said arm and having a slot and pin connection with said lever.

In testimony whereof I affix my signature.

EMEL LIIMATTA.